United States Patent
Isaacson et al.

(10) Patent No.: US 6,920,565 B2
(45) Date of Patent: Jul. 19, 2005

(54) METHOD AND SYSTEM FOR PROVIDING SECURE DIGITAL MUSIC DUPLICATION

(75) Inventors: Shawn Ray Isaacson, Roy, UT (US); Robert L. Short, Washington, VT (US); Eric R. Peters, Roy, UT (US)

(73) Assignee: Iomega Corporation, San Diego, CA (US)

( * ) Notice: Subject to any disclaimer, the term of this patent is extended or adjusted under 35 U.S.C. 154(b) by 918 days.

(21) Appl. No.: 09/891,441

(22) Filed: Jun. 25, 2001

(65) Prior Publication Data

US 2002/0196940 A1 Dec. 26, 2002

Related U.S. Application Data

(63) Continuation of application No. 09/587,509, filed on Jun. 5, 2000, and a continuation of application No. 09/588,149, filed on Jun. 5, 2000, now Pat. No. 6,718,446.

(51) Int. Cl.[7] ............................................... G06F 1/24
(52) U.S. Cl. ..................... 713/193; 713/200; 713/201
(58) Field of Search ................................ 713/193, 200, 713/201

(56) References Cited

U.S. PATENT DOCUMENTS

| | | | |
|---|---|---|---|
| 5,805,699 A | 9/1998 | Akiyama et al. | 380/4 |
| 6,282,654 B1 | 8/2001 | Ikeda et al. | 713/200 |

FOREIGN PATENT DOCUMENTS

| | | |
|---|---|---|
| EP | 0 813 194 A2 | 12/1997 |
| EP | 0 984 346 A1 | 3/2000 |
| EP | 1 032 543 A2 | 9/2000 |
| JP | 11 073 725 | 3/1999 |
| WO | WO 99/55055 | 10/1999 |

OTHER PUBLICATIONS

U.S. Appl. No. 09/061,493, filed Apr. 17, 1998, Kupka et al.
U.S. Appl. No. 09/191,666, filed Nov. 13, 1998, Kupka et al.
U.S. Appl. No. 09/191,689, filed Nov. 13, 1998, Kupka et al.
U.S. Appl. No. 09/191,976, filed Nov. 13, 1998, Kupka et al.
Hartung, F. et al., "Digital Rights Management and Watermarking of Multimedia Content for M–Commerce Application", *IEEE Communications Magazine*, 2000, 38(11), 78–84, XP–000969744.

*Primary Examiner*—Thomas R. Peeso
(74) *Attorney, Agent, or Firm*—James T. Hagler

(57) ABSTRACT

A system and method are provided wherein digital data representing content and associated license rights may copied to a storage medium, such as a removable storage medium, whereby the serial number of the copied-to storage medium is integrated into the licensing scheme utilized to secure the digital content. As a result, the digital content is pre-authenticated and bound to the copied-to storage medium, obviating the need to access a network or other location for access to the protected content.

27 Claims, 8 Drawing Sheets

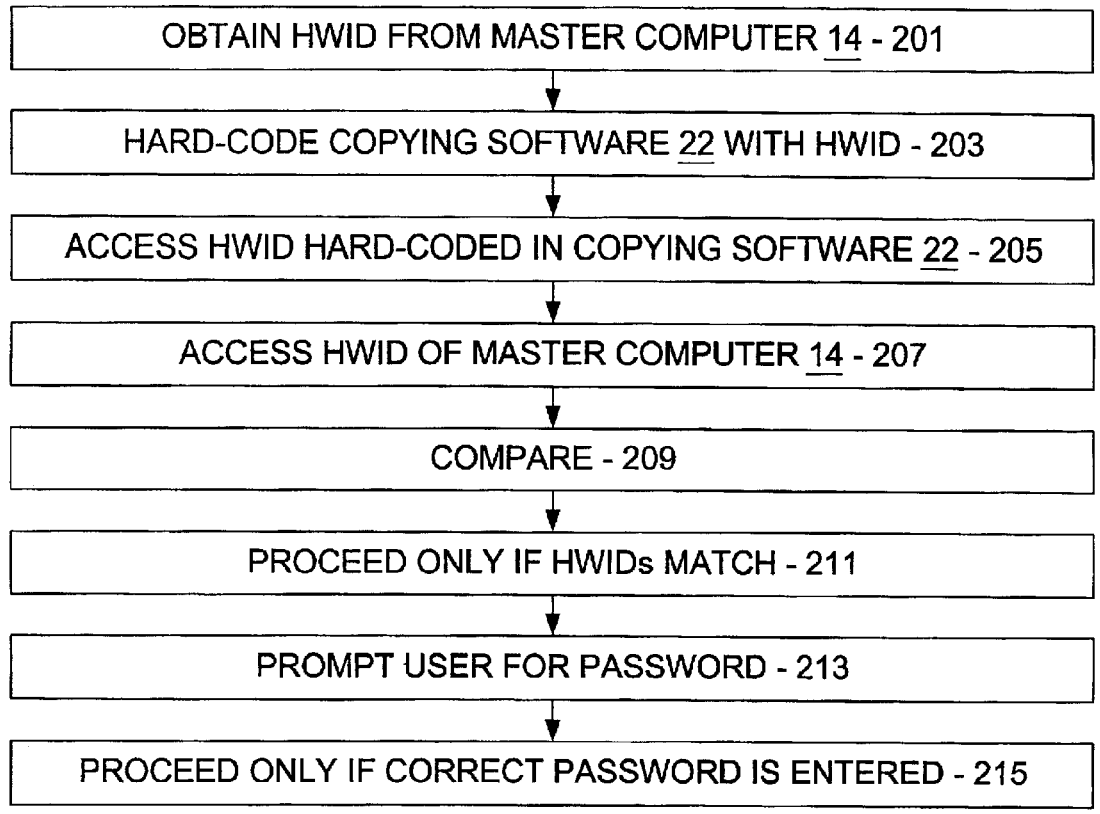

METHOD AND SYSTEM FOR PROVIDING SECURE DIGITAL MUSIC DUPLICATION

CROSS-REFERENCE TO RELATED APPLICATIONS

This application is continuation of co-pending U.S. patent application Ser. No. 09/587,509 and a continuation of Ser. No. 09/588,149 now U.S. Pat. No. 6,718,446, both filed on Jun. 5, 2000.

FIELD OF THE INVENTION

The present invention relates generally to a method and system for providing secure digital music duplication.

BACKGROUND OF THE INVENTION

Digital Rights Management (DRM) has received a lot of attention as a result of the ease with which digital data can be re-distributed ad infinitum without corruption. DRM systems have thus attempted to implement methods for encrypting music and applying certain digital rights to that piece of media with the express intent that you can not copy it, re-distribute it, or play the file without the right from the copyright holder to do so. For example, one system has a unique electronic serial number assigned to each disk. This serial number can be and is used as a key to secure and unlock digital music with its associated rights. For example, a particular digital sound file can be secured using the serial number on a portable disk for a portable disk player, so that the song can only be played when that disk is inserted into the system thus preventing re-distribution of the song. One unique challenge, therefore, is creating thousands of disks, or more, that have "secure" music that is secured using the unique serial number on each disk for retail sale. This process has been designed so that you cannot copy protected music, but a company that is part of the music distribution chain still needs to be able to copy with license from the copyright owners in an attempt to distribute and/or sell secure music on a specific type of media. To a company that manufactures storage media and related storage devices, for example, this is relevant because the company could sell music that can only be played on that company's equipment or media. This is also a relevant issue with respect to the process used to create secure music disks for others to market.

Storage media, and in particular re-writeable storage media, is at times shipped from a storage media manufacturer/distributor with pre-determined data already stored thereon. For example, the data may be one or more software programs, one or more data structures, one or more data files, and/or the like. Likewise, the re-writeable storage media may be a magnetic or optical in nature, and may be a tape, a disk, or the like. Moreover, the storage media may be read-only, write-only, read-write, or the like, as appropriate.

Once the storage media is shipped with the already-stored data, though, such storage media is quite obviously out of the hands of the manufacturer/distributor, who is then powerless to prevent anyone from making changes to the stored data on the storage media. Accordingly, it is oftentimes useful after shipment of the storage media to determine whether the data on the storage media has changed as compared with the originally shipped data. In addition, during production of the storage media with the data thereon based on a master version, it is useful at various points during the production process to confirm that the data on the storage media has not changed as compared with the data copied from the master. Accordingly, a benchmark can be provided that is placed on the storage media and that is closely tied to the master.

Tying these issues together, there are many references to secure digital rights management, but none that specifically address the problems associated with the mass reproduction of authenticated secure digital music. Some proposed systems refer to unauthenticated secure digital music that you distribute, then for which the user later applies for and/or pays for a license file to authenticate the music file. It would thus be advantageous to provide a robust solution for mass reproducing authenticated secure digital data such as music data, with license rights already in place.

SUMMARY OF THE INVENTION

The present invention provides a system and method wherein digital data representing content and associated license rights may copied to a storage medium, such as a removable storage medium, whereby the serial number of the copied-to storage medium is integrated into the licensing scheme utilized to secure the digital content. As a result, the digital content is pre-authenticated and bound to the copied-to storage medium, obviating the need to access a network or other location for access to the protected content.

Other features of the present invention are described below.

BRIEF DESCRIPTION OF THE DRAWINGS

The method and system for providing secure digital music duplication are further described with reference to the accompanying drawings in which:

FIG. 2 is a flow chart showing steps performed during controlling of access to a master computer;

FIG. 5 is a block diagram showing a data structure corresponding to the master image/image file of FIG. 3 in an image data file;

DETAILED DESCRIPTION OF THE INVENTION

Figure 1:
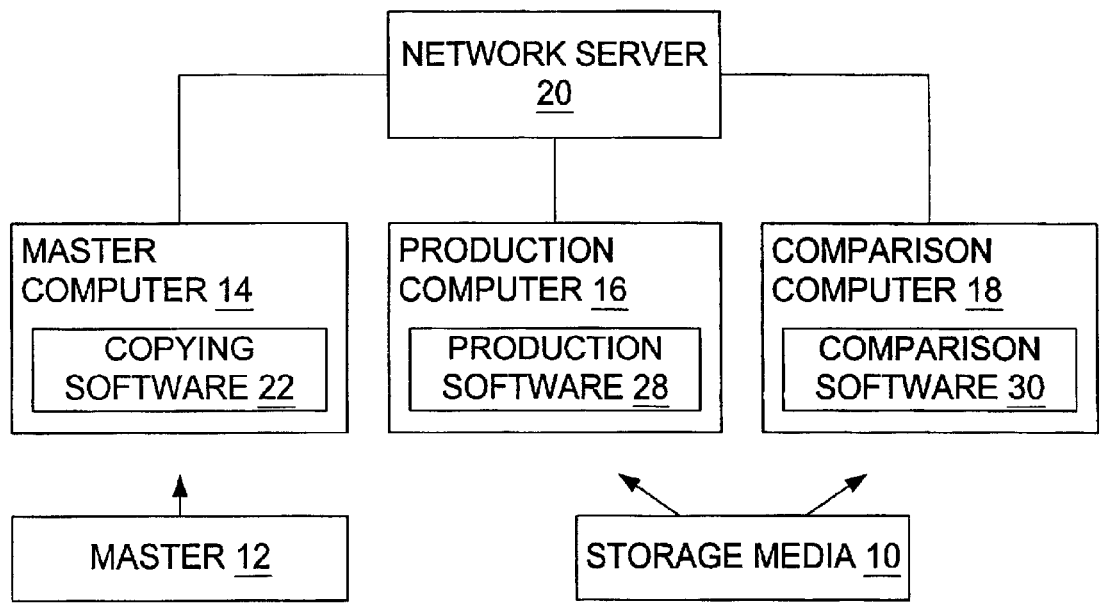
FIG. 1 is a block diagram showing a particular system for producing a benchmark on storage media.

U.S. application Ser. No. 09/587,509 and U.S. application Ser. No. 09/588,149, relate to systems and methods in which data is copied from a master storage medium to copied-to storage media. The same techniques relating to master disk production and target disk copying may be applied to the present invention. Referring to FIG. 1, in producing a storage media 10 having data thereon based on a master 12, it is to be understood that four basic operations take place: (1) a master 12 of the data to be stored on the storage media is obtained from an appropriate source and is accessed through a master computer 14 having relatively secure master copying software thereon; (2) an image file is made from the contents of the master 12 by way of the master computer 14; (3) the image file is copied to the copied-to storage media 10 by way of a production computer 16; and (4) the image file is compared to the copied-to storage media 10 by way of a comparison computer 18. Each operation will be addressed herein, in turn.

Each computer 14, 16, 18 may be any appropriate type of computer. Typically, each such computer 14, 16, 18 would have a display, one or more data input devices (keyboard, mouse, etc.), a processor, memory, and the like. Of course, one or more such elements may not be necessary, depending on circumstances, and therefore may be removed. Each computer 14, 16, 18 should of course have an appropriate storage media drive for reading from and/or writing to a storage media 10 and/or a master 12, as may be appropriate.

In the case of the production computer 16 and the comparison computer 18, the process of inserting the storage media 10 into and removing the storage media 10 from the respective drives (arrows 1 and 2 in FIG. 1) may be automated by use of appropriate apparatus such as for example a robotic device (not shown), especially in the case of a more than minimal volume operation. Moreover, such apparatus may also move the storage media 10 between the computers 16, 18 and the drives thereof, as appropriate. Any appropriate automation apparatus may be employed. Since the details of such automation apparatus are known to the relevant public, further details are not provided herein except as stated below.

As seen, each computer 14, 16, 18 may be networked together as is necessary to share information, as will be discussed in more detail below. Thus, each computer 14, 16, 18 can access the information on the other computers 14, 16, 18, assuming of course that appropriate security access is granted. In addition or in the alternative, information may be accessed by each computer 14, 16, 18 from a network computer or server 20. Of course, any appropriate networking and sharing arrangements may be employed. In fact, information may even be exchanged between computers by hand (i.e., by portable storage media) if appropriate and/or necessary. Moreover, two or more of the three computers 14, 16, 18 may even be embodied in the form of a single computer.

Controlling Use of Master Copying Software

Preliminarily, it should be ensured that the master 12 originates from a trustworthy source, and is not created by a non-approved entity. Accordingly, the master 12 should be obtained from such trustworthy source in some manner to ensure that the data on such master 12 is in fact from the trustworthy source and in a form that the trustworthy source intended, and also to ensure that the data on such master 12 is itself trustworthy and has not been tampered with. The master 12 may originate from any appropriate source and have any appropriate data thereon. As but one example, the master 12 may originate from the marketing department of a manufacturer of the storage media 10, whereby the data stored on the master 12 results from cross-promotional arrangements with other manufacturers and/or distributors. As is explained below, the master 12 is a storage media similar to if not identical with the copied-to storage media 10, although the master may alternatively be a different type. Importantly, the entity copying the data from the master 12 by way of the master computer 14 must be trustworthy also. Then, the master computer 14 receiving the master 12 for copying purposes may be tightly controlled, such master computer 14 includes copying software 22 that copies the data from the master 12, as will be explained in more detail below, and the copying software 22 is tightly tied to such master computer 14. Referring now to FIG. 2, the master computer 14 includes a hardware ID ("HWID") or the like that is unique to the master computer 14, such HWID is obtained from the master computer 14 (step 201), the copying software 22 is hard-coded with such HWID (step 203), and such copying software 22 operates only on the master computer 14 having such HWID. For example, if the master computer includes a PENTIUM III processor as produced and/or marketed by INTEL Corporation of Santa Clara, Calif., then the HWID may be the unique ID associated with the PENTIUM III processor ("the PENTIUM III ID"). Of course, any other appropriate identifying indicia from any particular master computer 14 may be employed. Any appropriate methodologies may be employed to obtain the HWID from the master computer 14 and to hard-code such HWID into the copying software 22. Since such methodologies should be known or apparent to the relevant public, further details thereof are not disclosed herein.

When the master computer 14 is directed to launch the copying software 22 by a user or the like, such copying software 22 may access the HWID hard-coded therein (step 205), may access the HWID of the master computer (step 207), and may compare such accessed HWID with such hard-coded HWID (step 209). The copying software 22 may then proceed only if the accessed and hard-coded HWIDs match (step 211).

Still referring to FIG. 2, to further enhance security, the copying software 22 may require a correct password from the user thereof. Thus, the copying software is preprogrammed with such password, prompts the user to enter such password (step 213), and proceeds only if the correct password is entered (step 215). Thus, such copying software 22 operates only if such software 22 resides on the correct master computer 14 and only if initiated by a user with the correct password. As a result, a non-authorized entity is severely limited in its ability to copy data onto a storage media 10 from a master 12 in the manner to be detailed below.

Operation of Master Copying Software 22

Once the copying software 22 has verified that it is on the correct master computer 14 and is being operated by a user with the correct password (as detailed in connection with FIG. 2), such software 22 may then be employed to copy the data from the master 12 for purposes of copying such data to a copied-to storage media 10. Such copying software 22 may copy the master 12 by creating a master image 24 (FIG. 3) from the master 12, as will be explained in more detail below.

Presumably, the master 12 and the data thereon is in its final form and has been created by a trustworthy entity according to a particular operating system. As such, the data is organized on the master 12 according to the particular operating system, and the master 12 includes referencing features specified by the particular operating system for referencing the data. Here, it is to be assumed that the operating system is a disk operating system such as the MICROSOFT DISK OPERATING SYSTEM (DOS) produced and/or marketed by MICROSOFT Corporation of Redmond, Wash., or the like. Of course, other operating systems can be utilized.

The master 12 is of course properly inserted into an appropriate drive in the master computer 14 such that the master computer 14 can access the data on such master 12. Referring now to FIG. 4, the copying software 22 may create such master image 24 (FIG. 3) in the following manner. Preliminarily, such copying software 22 as operating on the master computer 14 accesses the master 12 in the drive thereof, and in particular accesses a file directory on the master 12 (step 401), such as a DOS file allocation table (FAT). Based on such FAT, and as should be appreciate, the copying software 22 can ascertain file information such as what data/files are located on the master 12, where such data/files are located on the master 12, the size of each file, age information about each file, and other file information (step 403).

Based on such file information from the FAT, the copying software 22 then reads all the data on the master 12 into a single image file that constitutes the master image 24 (step 405). Such image file/master image 24 may be stored at least preliminarily in an appropriate memory on the master computer 14, or may be preliminarily stored elsewhere. Preferably, such image file/master image 24 contains not only all the files on the master 12, but each FAT from the master 12 (if there is more than one such FAT), all partition information from the master 12, all boot information from the master 12, all directory entries from the master 12, etc. That is, the image file/master image 24 as created from the master 12 contains the entirety of the information stored on the master 12, whether such information derives from a file, a file management structure, a storage media management structure, or the like. Creating such an image 24 from such master 12 is known or should be apparent to the relevant public, and therefore need not be described herein in any detail.

As may be appreciated, then, by copying the entirety of the master 12 into the single image file/master image 24, such master image 24 may then be employed at a later time to create a copied image of the master 12 on a copied-to storage media 10. Moreover, the copied image on the copied-to storage media 10 causes the copied-to storage media 10 to behave as if it were the master 12. Thus, if the master 12 includes disk information that such master is a 100 megabyte magnetic disk, the copied-to storage media 10 will behave as if it were a 100 megabyte storage disk, even if such copied-to storage media 10 is in fact a 250 megabyte storage disc, for example.

Once the master image 12 is created from the master, such master image 12 is preferably manipulated to include the aforementioned benchmark. Such benchmark may comprise certain tracking and verification information. Thus, each copied-to storage media 10 as copied from the master image 24 also includes such tracking and verification information/benchmark. Preferably, the tracking and verification information/benchmark is tied to the master image 24/image file or a portion thereof. Accordingly, and importantly, alteration of the image file will cause a mis-match with regard to the tracking and verification information/benchmark in such image file, as will be explained below. Likewise, and also importantly, alteration of the copied-to storage media 10 will also cause a mis-match with regard to the tracking and verification information/benchmark in such storage media 10 as copied from such image file/master image 24.

Figure 3:
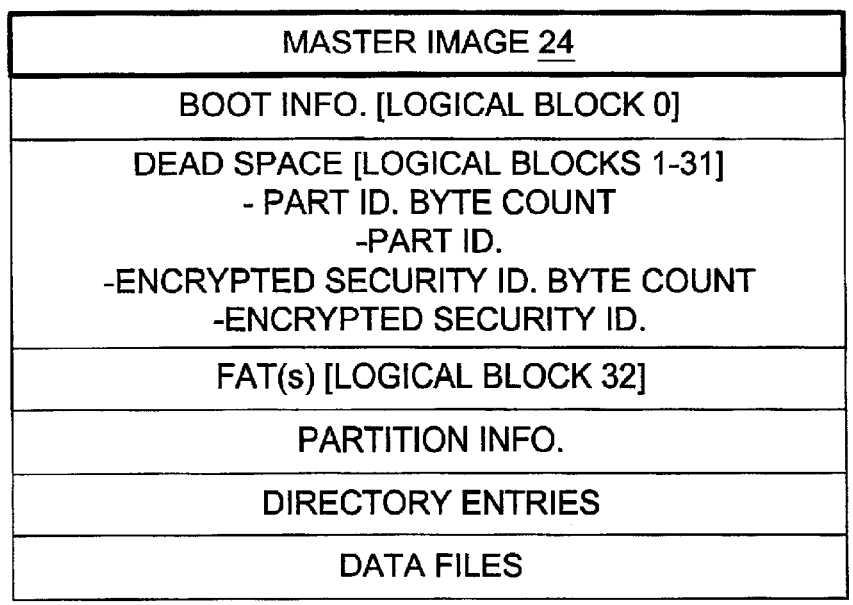
FIG. 3 is a block diagram showing the structure of a master image/image file created.
Figure 4:
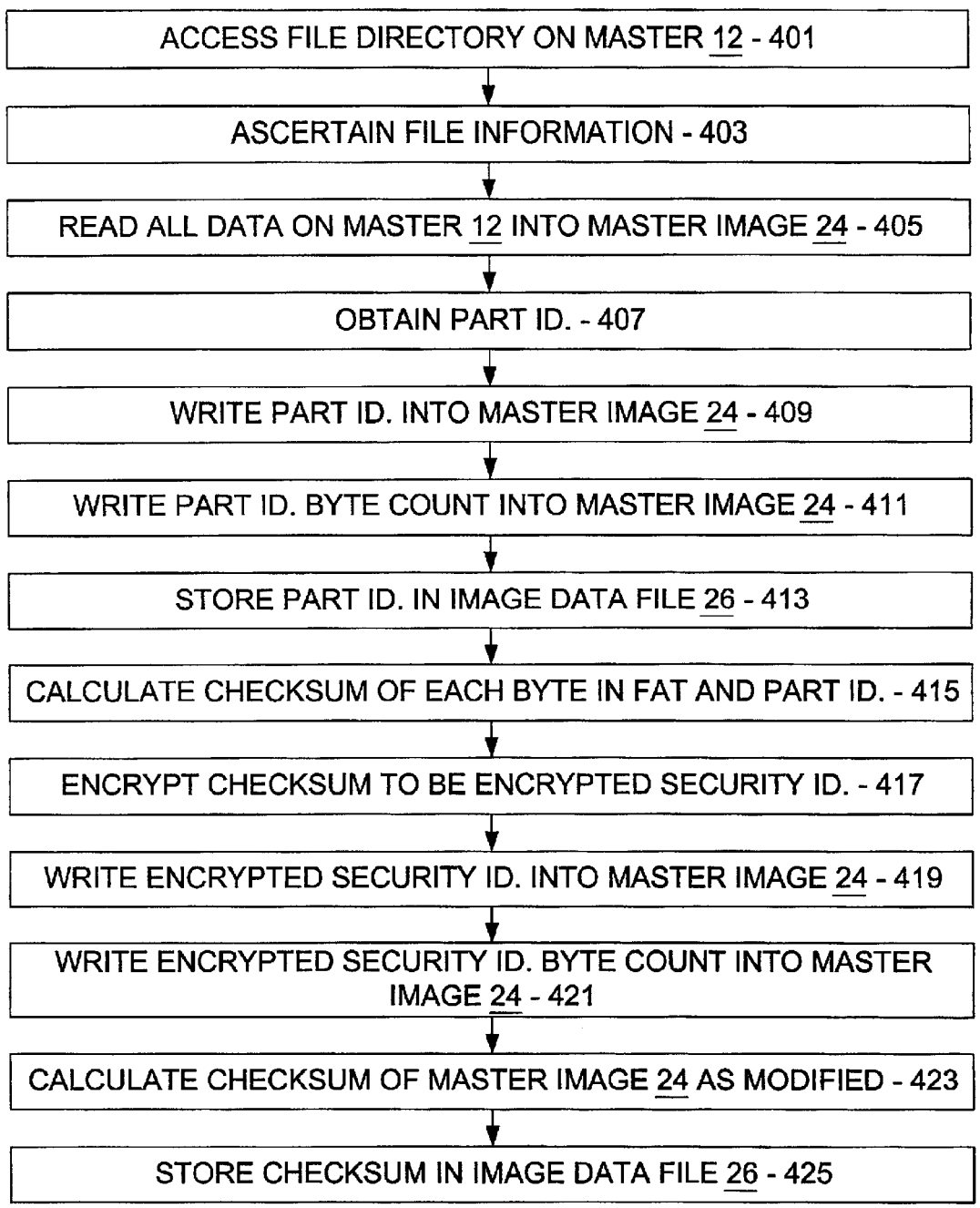
FIG. 4 is a flow chart showing steps performed during copying of a master to the master image/image file of FIG. 3.

As seen in FIG. 3, the tracking and verification information/benchmark includes a part identifier such as a part number or model number. As may be appreciated, such part identifier may be assigned on a random or pre-determined basis, and can be employed to label the image file/master image 24 with an identifier. Such part identifier may take any particular form. For example, such part identifier may be a 10-digit number, a 20-character alphanumeric, etc. As will be appreciated, the part identifier identifies the master image 24, but may also be employed to verify data on a copied-to storage media 10 when copied from such master image 24.

Preferably, the copying software 22 obtains the part identifier from an appropriate source (step 407) and writes the obtained part identifier into an area of the master image 24/image file (step 409) such that the part identifier appears in an inaccessible area when the image file is copied to the storage media 10. That is, according to the architecture of any particular disk operating system, certain physical space on a corresponding storage media is inaccessible by way of such disk operating system, or more simply is "dead". For example, in the aforementioned MICROSOFT DOS disk operating system, at least with regard to the IOMEGA ZIP disk and drive as produced and/or marketed by IOMEGA Corporation of Roy, Utah, logical block 0 of the storage media contains boot information, logical block 32 contains the FAT, and logical blocks 1–31 are expected to be blank.

Since such logical blocks 1–31 are expected to be blank, such disk operating system provides no capability to access such logical blocks 1–31, or put another way such logical blocks 1–31 on such storage media are inaccessible by way of such disk operating system. Although inaccessible by the disk operating system, an appropriate utility application may of course be employed to direct the drive receiving the storage media 10 to write information to/read information from such otherwise inaccessible logical blocks 1–31 and perhaps other dead space. Such utility application is known or should be apparent to the relevant public, and therefore need not be described herein in any detail. Preferably, such utility is not normally available to the general public such that the general public cannot normally access such dead space. Thus, the general public cannot normally alter or otherwise compromise data stored in the dead space on the storage media 10.

The part identifier may be a 10-byte identifier and is written into the master image 24 to appear in the copied-to storage media in dead space as such. For example, in connection with the aforementioned IOMEGA ZIP disk, such 10-byte identifier may be written to appear in logical block 1. For verification, a 1-byte byte count or the like of the 10-byte identifier may also be written into the master image 24 to appear in such logical block 1 (step 411). For example, the 1-byte checksum and the 10-byte identifier may be written into the master image 24 to appear in that order in logical block 1 of the storage media 24 at the beginning thereof. Of course, the part identifier and the verifying checksum may be written to appear in other areas of dead space, and other forms of verification may be employed. The copying software also may store the part identifier in a separate file 26 (FIG. 5) for later reference (step 413), as will be discussed in more detail below.

The tracking and verification information/benchmark may also include an encrypted security identifier closely tied to the data in the master image 24/image file, such as for example an encrypted checksum of at least a portion of the data in such master image 24/image file. Thus, alteration of such data will result in a mis-match with regard to the encrypted security identifier. The copying software 22 on the master computer 14 may develop the encrypted security identifier based on the entire FAT and also based on the part identifier as such items appear in the master image 24/image file. Notably, basing such identifier on the FAT is particularly useful since practically any alteration to the data on the copied-to storage media 10 will result in a change in the FAT thereof, thus resulting in the aforementioned mis-match. Of course, such encrypted security identifier may be based on other elements as they appear in the master image 24/image file.

The copying software 22 may produce the encrypted security identifier by calculating the checksum of each byte in the FAT and in the part identifier (step 415), and then encrypting such checksum by way of any appropriate encrypting algorithm (step 417). Thus, if the FAT or the part identifier changes, the encrypted checksum will no longer match, as will be discussed in more detail below. The encrypting algorithm employed may be a one-way or two-way encrypting algorithm, and may produce an encrypted value having a pre-determined length, such as 100 bytes. Of course, other methods of producing an encrypted security identifier tied to the data in the image file may be employed.

The copying software 22 then writes the resulting 100-byte encrypted checksum into the aforementioned dead space in the same manner as the part identifier (step 419). For example, such 100-byte encrypted number security identifier may be written into the master image 24 to appear in logical block 1 with the 10 byte part identifier. For additional security, the copying software 22 may also write a 1-byte byte count of the 100-byte encrypted checksum to appear in the logical block 1 (step 421). Such 1-byte byte count is written immediately after the 10-byte part identifier, and is immediately followed by the 100-byte encrypted checksum. Of course, other methods of writing the encrypted checksum and related indicia into the dead space may be employed.

Although it should be apparent to the relevant public, it is nevertheless noted that writing information into the dead space of the copied-to storage media 10 in actuality means writing such information into the corresponding master image 24/image file in an appropriate location thereof such that such information is appropriately copied into the dead space when the master image 24/image file is copied to the copied-to storage media 10. It should also be apparent but again is nevertheless noted that any software that reads from/writes to such dead space, such as the software discussed below, must include or have access to an appropriate utility application in order that such software can in fact direct the drive receiving the copied-to storage media to read from/write to such dead space as appropriate. Further, it should be noted that since such information is not indexed in the FAT of the master image 24/image file or of the copied-to storage media 10, such information must be written into the dead space in a pre-determined location known to each entity that is to access such information.

The encrypted checksum disclosed above is never stored anywhere other than in the master image 24/image file and on the copied-to storage media 10. Instead, such encrypted checksum is re-derived at appropriate times and is then compared with the stored value in the master image 24/image file or on the copied-to storage media to verify that the FAT and the part identifier on the copied-to storage media 10 have not been changed as compared with the FAT and the part identifier in the master image 24/image file produced by copying software 22 on the master computer 14. As should be appreciated, the FAT on the copied-to storage media 10 will change if, for example, a file is added to or deleted from such media 10, a file is altered in size, location, or date of last access, or the like. To summarize, then, any significant change to the data on the copied-to storage media 10 will result in a change to the FAT thereof and will therefore result in a mis-match with regard to the originally derived encrypted checksum.

As it stands, the master image 24/image file produced by the copying software 22 on the master computer 14 includes the entirety of the data on the master 12, and also includes the part identifier and the encrypted checksum stored in dead space. The copying software in addition may calculate a second checksum of the entire master image 24/image file, including the part identifier and the encrypted checksum (step 423), and then may store the second checksum in the above-mentioned separate file 26 for later reference (step 425) to ensure that the master image 24/image file has not become corrupted. For example, the separate file 26 is an image data file 26 that includes a data structure corresponding to the image file, where the data structure includes an image name as given to the image file, the second checksum, and the part identifier, among other things. Of course, other information may be stored in the image data file. Moreover, the image data file 26 may have information regarding additional image files, where each image file has a corresponding data structure with such information stored therein. Alternatively, the aforementioned data structure in the image data file may instead be stored in the master image 24/image file, perhaps in the dead space thereof, perhaps obviating the need for such image data file 26.

Copying the Image File to the Copied-to Storage Media

Now that a master image 24/image file based on the master 12 is present in its finalized form, a production copy of the master 12/master image 24 may be made on a copied-to storage media 10 by way of the production computer 16, and specifically by production software 28 loaded onto the production computer 16. As should be evident, the production computer 16 and production software 28 must have access to the finalized master image 24/image file. In addition, and as will be explained below, such items should also have access to the image data file 26. Such master image 24/image file and such image data file 26 may be located on and accessible from the master computer 14 or the network server 20, or may be located on and accessible to the production computer 16 itself, although such files may be located elsewhere.

Figure 6:
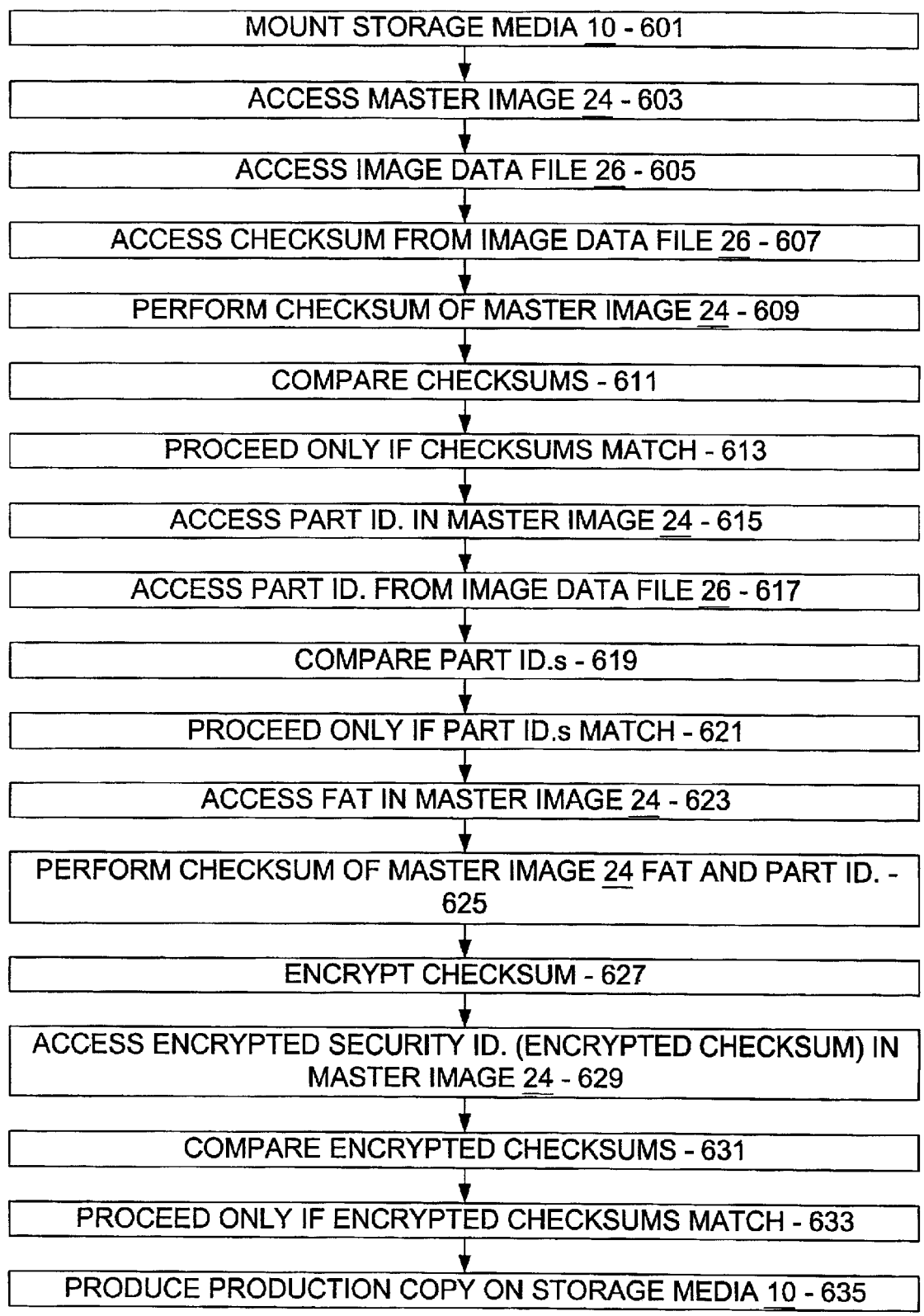
FIG. 6 is a flow chart showing steps performed during production of a production copy of storage media from the image file.

The production computer 16 may be user-directed to make a production copy of the master image 24/image file on a copied-to storage media 10, or may automatically make such a production copy according to a pre-defined routine. In either case, and referring now to FIG. 6, the copied-to storage media 10 is appropriately mounted to an appropriate media drive coupled to the production computer 16 (step 601), the production software 28 on the production computer 16 accesses the master image 24/image file (step 603), and the production software 28 also accesses the image data file 26 with the data structure corresponding to the master image 24/image file, where the data structure includes the image name as given to the master image 24/image file, the second checksum, and the part identifier, among other things (step 605).

After accessing the master image 24/image file and the image data file 26, the production software 28 on the production computer 16 accesses the second checksum from the corresponding data structure in the image data file 26 (step 607), and employs such accessed second checksum to verify that the accessed master image 24 image file is not corrupted. In particular, the production software 28 performs a checksum of the entire accessed master image 24/image file including the part identifier and the encrypted checksum to obtain a performed checksum value (step 609), and compares the performed checksum value with the accessed second checksum to determine whether they match (step 611). If a match is found, the image file is not corrupted, and the production software 28 may proceed (step 613). If a match is not found, the image file is corrupted and the production software 28 does not proceed. Notably, the aforementioned checksum procedure may be performed at any appropriate time. For example, such procedure is performed each time a master image 24/image file is newly copied to the production computer 16, or each time the master image 24/image file is accessed to make a production copy on a copied-to storage media 10.

Assuming the second checksums compare favorably, the production software 28 next accesses the part identifier as embedded in the dead space in the master image 24/image file (step 615), accesses the part identifier from the corresponding data structure in the image data file 26 (step 617), and compares the master image 24/image file part identifier with the image data file 26 part identifier to determine whether they match (step 619). If a match is found, the image file has not been adulterated, at least with regard to the part identifier, and the production software 28 may proceed (step 621). If a match is not found, the image file has been adulterated, at least with regard to the part number, and the production software 28 does not proceed. Such adulteration may occur when an unauthorized entity attempts to create a master image 24/image file without benefit of the master computer 14, whereby such unauthorized image file in fact fails to contain a proper part identifier. Of course, such adulteration may also occur under other circumstances.

Assuming the part identifiers compare favorably, the production software 28 next accesses the FAT from the master image 24/image file (step 623), performs a checksum of the FAT and the part identifier (which was previously accessed in step 615) (step 625), and then encrypts such checksum by way of the same encrypting algorithm previously employed by the master computer 14 to produce a production computer encrypted checksum (step 627). The production software 28 then accesses the encrypted checksum as embedded in the dead space in the master image 24/image file (step 629), and compares the image file encrypted checksum with the production computer encrypted checksum to determine whether they match (step 631). If a match is found, the master image 24/image file has not been adulterated, at least in any substantial way such that the FAT or the part identifier would be affected, and the production software 28 may proceed (step 633). If a match is not found, the master image 24/image file has been so adulterated, and the production software 28 does not proceed. Again, such adulteration may occur when an unauthorized entity attempts to create a master image 24/image file without benefit of the master computer 14, whereby such unauthorized master image 24/image file in fact fails to contain a proper encrypted checksum. Of course, such adulteration may also occur under other circumstances.

To summarize, then, prior to producing a producing a production copy on storage media 10 from the master image 24/image file, the production software 28 first verifies the part identifier, which is an unencrypted value, and then verifies the checksum, which is an encrypted value. If either verify fails, such image file is not employed to make the production copy. However, and of course, if both verifies succeed, such image file may then be appropriately employed by the production software 28 on the production computer 16 to produce the production copy on the mounted production (copied-to) storage media (step 635).

As should be appreciated, producing a production copy from a master image 24/image file as is done in step 635 is generally known to the relevant public, and therefore need not be described here in any further detail. It should also be appreciated that any appropriate method for producing such production copy from such master image 24/image file may be employed. The production copy on the storage media 10 is identical to the master 12 in all respects, except that such production copy has the embedded encrypted checksum and the embedded part identifier in the aforementioned dead space.

Comparing the Image File and the Copied-to Storage Media

Figure 7:
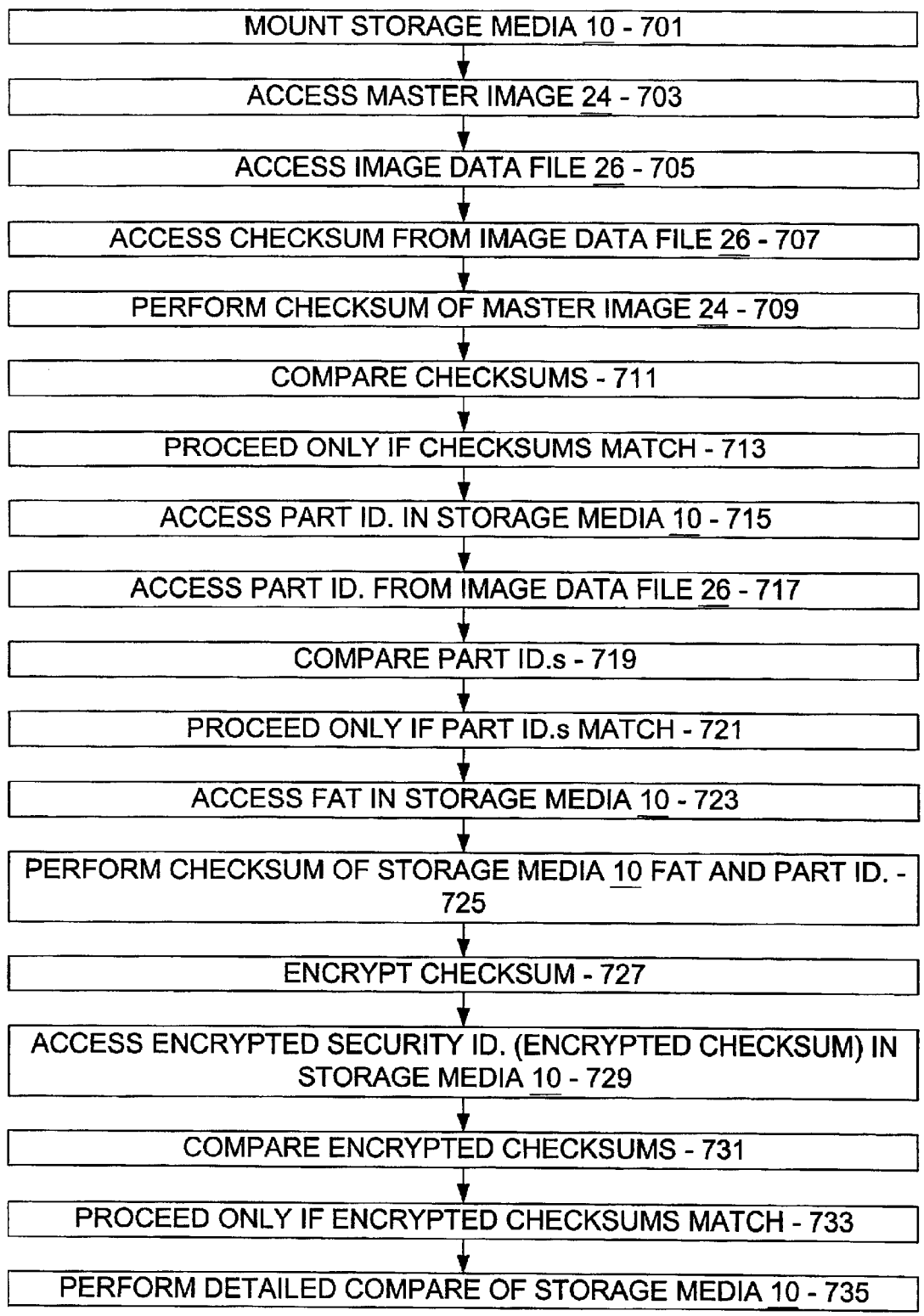
FIG. 7 is a flow chart showing steps performed during a comparison check of the production copy of storage media.

Once the production software 28 on the production computer 16 makes the production copy of the master 12 on the storage media 10 from the master image 24/image file, such storage media 10 must be compared with the master image 24/image file to ensure that the production copy is an accurate rendering of the master image 24/image file. Such a compare may be performed by comparison software 30 on the comparison computer 18 (FIG. 1). As before with regard to the production computer 16, and turning now to FIG. 7, the production copy of the storage media 10 is appropriately mounted to an appropriate drive of the comparison computer 18 (step 701), and the comparison software 30 on the comparison computer 18 has access to the master image 24/image file and the corresponding data structure in the image data file 26. Essentially, the comparison software 30 repeats the steps performed by the production software with regard to the second checksum, the part identifier, and the encrypted checksum before actually performing a compare, except that such functions are performed with regard to the mounted production copy of the storage media 10, and not the master image 24/image file.

In particular, the comparison software 30 on the comparison computer 16 accesses the master image 24/image file (step 703), the comparison software 30 also accesses the image data file 26 with the data structure corresponding to the master image 24/image file (step 705), and the second checksum from the corresponding data structure in the image data file 26 (step 707), and employs such accessed second checksum to verify that the accessed master image 24/image file is not corrupted. In particular, the comparison software 30 performs a checksum of the entire accessed master image 24/image file including the part identifier and the encrypted checksum to obtain a performed checksum value (step 709), and compares the performed checksum value with the accessed second checksum to determine whether they match (step 711). If a match is found, the image file is not corrupted, and the comparison software 30 may proceed (step 713). If a match is not found, the image file is corrupted and the comparison software 30 does not proceed.

Assuming the second checksums compare favorably, the comparison software 30 next accesses the part identifier as embedded in the dead space in the production copy of the storage media 10 (step 715), accesses the part identifier from the corresponding data structure in the image data file 26 (step 717), and compares the master image 24/image file part identifier with the image data file 26 part identifier to determine whether they match (step 719). If a match is found, the data on the storage media 10 has not been adulterated, at least with regard to the part identifier, and the comparison software 30 may proceed (step 721). If a match is not found, the data on the storage media 10 has been adulterated, at least with regard to the part number, and the comparison software 30 does not proceed.

Assuming the part identifiers compare favorably, the comparison software 30 next accesses the FAT from the production copy of the storage media 10 (step 723), performs a checksum of the FAT and the part identifier (which was previously accessed in step 715) (step 725), and then encrypts such checksum by way of the same encrypting algorithm previously employed by the master computer 14 to produce a production computer encrypted checksum (step 727). The comparison software 30 then accesses the encrypted checksum as embedded in the dead space in the production copy of the storage media 10 (step 729), and compares the production copy encrypted checksum with the comparison computer encrypted checksum to determine whether they match (step 731). If a match is found, the data on the storage media 10 has not been adulterated, at least in any substantial way such that the FAT or the part identifier would be affected, and the comparison software 30 may proceed (step 733). If a match is not found, the data on the storage media has been so adulterated, and the comparison software 30 does not proceed.

To summarize, then prior to comparing the production copy of the storage media 10 with the master image 24/image file, the comparison software 30 first verifies the part identifier of the production copy, which is an unencrypted value, and then verifies the checksum of the production copy, which is an encrypted value. If either verify fails, such production copy is deemed to be corrupted or otherwise improperly made. However, and of course, if both verifies succeed, the comparison software 30 may then compare the production copy of the storage media 10 with the master image 24/image file in detail (step 735).

As should be appreciated, such detailed comparison is generally known to the relevant public, and therefore need not be described here in any further detail. It should also be appreciated that any appropriate method for performing such detailed comparison may be employed. In general, the detailed comparison by the comparison software 30 on the comparison computer 18 ensures that the production copy of the storage media 10 is a faithful rendition of the master image 24/image file. Assuming the storage media compare succeeds, such storage media is approved for distribution. Otherwise, the storage media is not approved and may be discarded or may be employed for another production copy, assuming the storage media is not physically defective or otherwise unsuitable.

It is to be noted that in performing the various steps detailed above, the copying software 22, production software 28, and comparison software 30 may employ any appropriate methodologies and any appropriate programming, and may be written in any appropriate programming language. Since such methodologies, programming, and languages should be known or apparent to the relevant public, further details thereof are not disclosed herein.

As should now be appreciated, benchmarks are associated with a master image 24/image file and are employed to ensure that such image file is a faithful representative of a master 12, and also to ensure that a production copy of storage media 10 made from the image file is a faithful reproduction of such image file. Thus, an intervening entity cannot manipulate the image file or the production copy without such manipulation being detectable. In addition, if the production copy of the storage media 10 is distributed and returned, the comparison software 30 on the comparison computer 18 or another computer may perform a compare of the returned storage media 10 with the corresponding image file to determine whether the returned storage media 10 has been altered in any manner. Depending on the purpose and result of the determination, then, appropriate action may be taken.

In the foregoing description, a new and useful benchmark is generated that is placed on a master image 24/image file made from a master 12 and therefore on a production copy of a storage media 10 made from the master image 24/image file. Accordingly, the benchmark is closely tied to such master 12, and reference may be made to the benchmark at various times to determine whether the data in the master image 24/image file and/or on the storage media 10 has changed as compared with the master 12.

Method and System for Providing Secure Digital Music Duplication

The foregoing description pertains to and enhances by way of relevant background the techniques of the present invention for mass reproduction of authenticated secure digital music. The present invention teaches steps for creating an encrypted image of secure Windows Media Audio (WMA) file(s), or files formatted according to a different format, that are uniquely authenticated to a single medium, allowing a user to access and play the files upon receipt or purchase of that medium.

These processes are described in the exemplary context of encryption code from Microsoft® for their particular secure WMA acm codec (compression/decompression) algorithm. However, it will be appreciated by one of ordinary skill in the art that these processes can be used with any other security and codec provider in similar processes, just using a different encryption and security method and/or algorithm.

In one embodiment of the present invention, in a first process, the user takes unsecured WMA files that the user has encoded. Then, they are protected using a Robodisk algorithm. This proprietary protection operation encrypts the files with a randomly generated key for each file. The Robodisk program also creates a file with the random encryption keys used to protect the files for generating licenses stores on client machines used for duplication.

In a second process, the user builds the image from the encrypted protected content that has not yet been authenticated to a particular disk. The protected content is copied onto the master disk. An exact image, referred to as an ABS image, of this master disk is then created. Audit images and checksums are created and reported for use in duplication, auditing and general error control.

Figure 8:
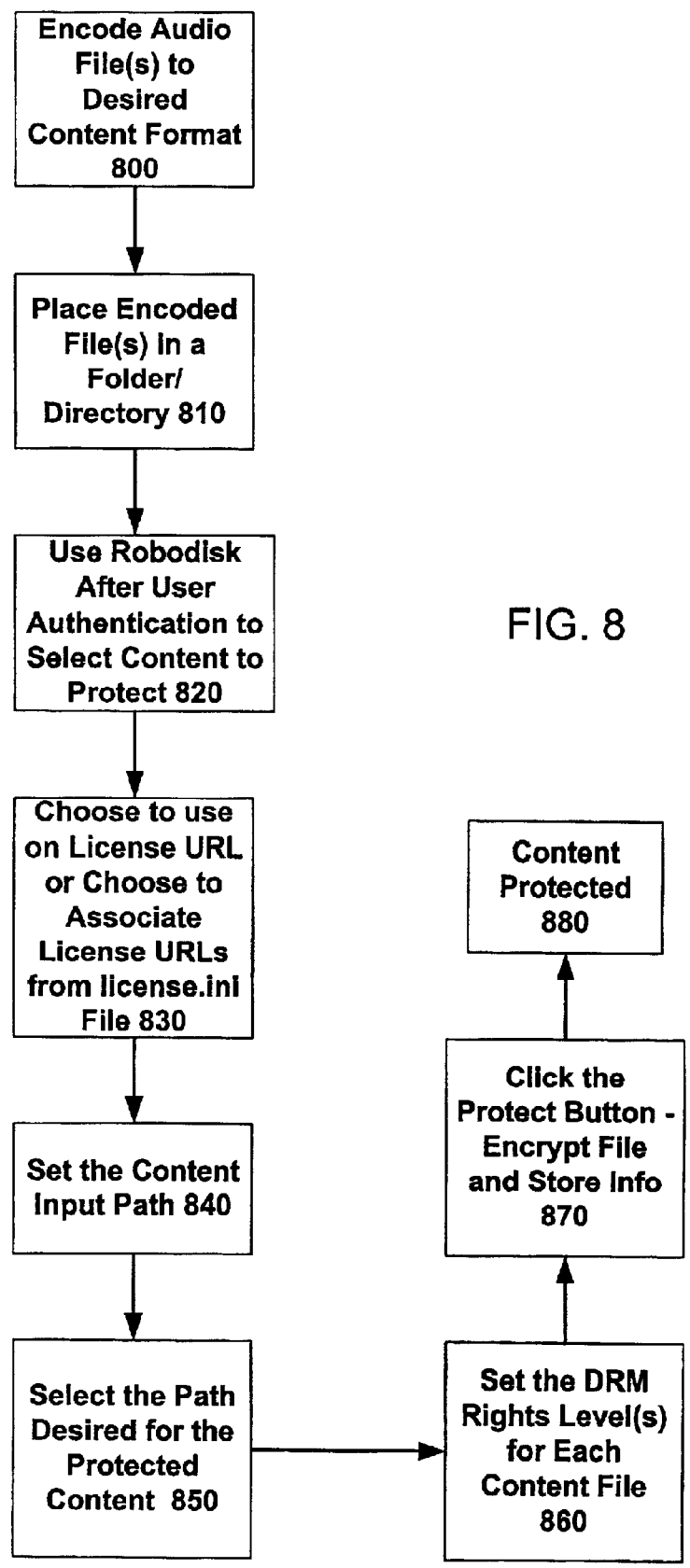
FIG. 8 is a flow chart illustrating an exemplary process whereby content is identified and protected in accordance with the present invention.
Figure 9:
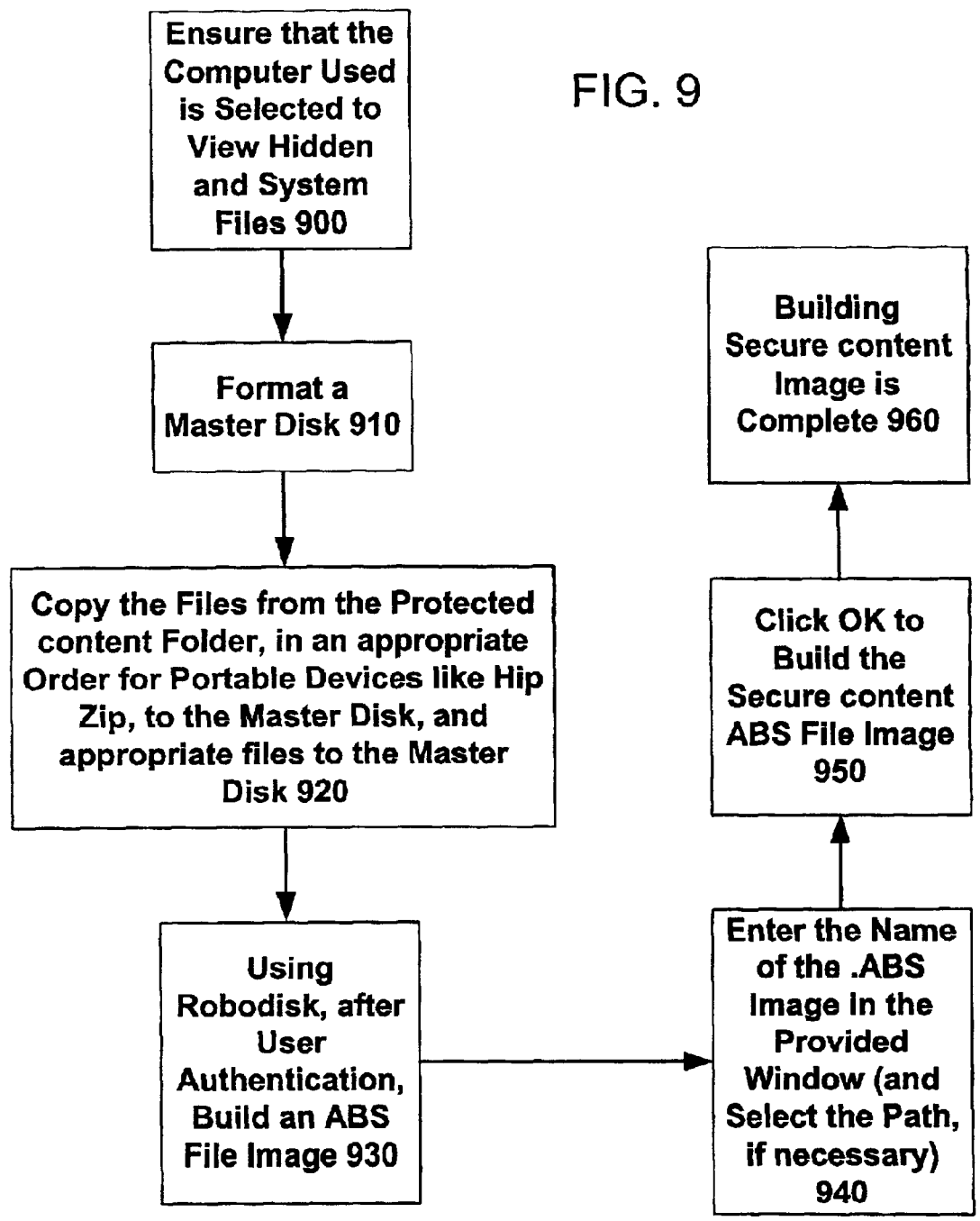
FIG. 9 is a flow chart illustrating an exemplary process whereby an encrypted disk image is built in accordance with the present invention.
Figure 10:
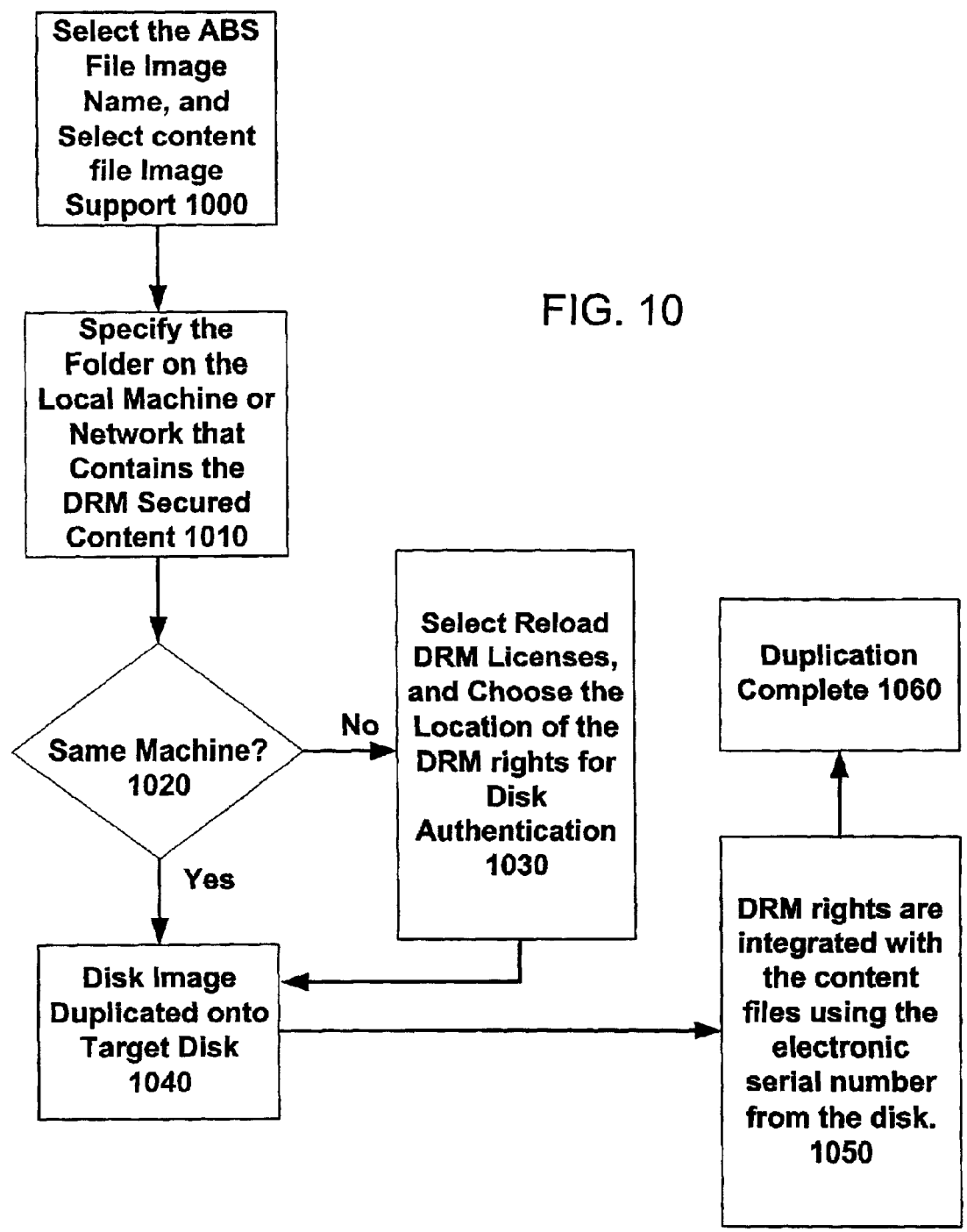
FIG. 10 is a flow chart illustrating an exemplary process whereby the image is copied to a target medium in accordance with the present invention.

In a third process, the ABS image is burned or duplicated onto new target disk(s). After the ABS image is copied onto the disks, the disks are subjected to an integration process to authenticate the music files to the serial number of the disk. This process uses the serial number from the disk, and along with the functionality of pre-packaged code from Microsoft®, the integration information is created. The Robodisk software then integrates the content on the disk with the serial number information gathered from each unique target disk. FIGS. 8 to 10 illustrate in an exemplary fashion one way that these three processes may be implemented in accordance with the present invention i.e., to protect content, build disk images, then duplicate and integrate each duplicated disk image. After the integration is complete, the files can be played in a variety of portable devices and personal computers because the content is tied to the medium.

Using the techniques of the present invention, it is thus possible to duplicate disk images on a disk by disk basis, by protecting one disk, creating the image, copying the image, integrating the duplicated content with the electronic serial number of each piece of media, and allowing it to be played on one computer. However, it is also possible to create the image and duplicate the same image to multiple targets simultaneously using multi-threaded code. This way, it is possible to copy a large number of disks using only one computer, faster than an operating system can do it sequentially, and then to integrate the content to authenticate it to the media onto which it was duplicated.

FIG. 8 illustrates an exemplary process by which the content is protected with license rights. At 800, one or more audio files are encoded to an unsecured format, such as WMA, although the present invention is not limited to the WMA format. At 810, the encoded files are placed into a folder or directory, and ordered accordingly if there are multiple files. At 820, after user authentication according to any known user authentication technique, a proprietary Robodisk algorithm i.e., a software product that forms an image file such as an image file according to the above-described techniques, is applied to the target content to be protected. At 830, one or more license URLs is associated with the target content. This may be from a license initialization file, e.g. license.ini, or a blanket license may be chosen for the content. Alternatively, an input path may be specified for licensing information, for devices connected to a network. The digital rights contained in the licensing schema may then be used to determine the scope of the license rights with respect to the music or content i.e., whether rights include unlimited play, a certain number of plays, a timed play window, etc.

At 840, the software requests that the user enter a content input path, such as the input path to the directory where content was placed at 810. At 850, the output path is selected for the content where the protected encrypted content will be stored. At 860, the user of the software may specify the DRM rights level(s) for each content file to be protected. These include, but are not limited to, the application of rules relating to device specific rendering, timing limitations, access levels and the like. Then, at 870, the user clicks the protect button, or effects some other means of assenting to protection of the selected files with the selected license rights. As a result, at 880, the content and license information is encrypted, and stored according to the specified output path.

FIG. 9 illustrates an exemplary process by which an encrypted disk (master) image is created, based upon the encrypted file stored as a result of the process of FIG. 8. After it is ensured that the computer used is selected to view hidden and system files at 900, a master disk is created at 910 by properly formatting and adding the proper volume label to the disk in accordance with master disk formatting procedure. This ensures that there is no residual data on the master disk that may interfere with the process. At 920, the protected content files created as a result of FIG. 8 are copied to the master disk, in the order in which it will be desirable to render the content contained therein e.g., for a portable device such as Hip Zip® or other type of rendering device. The license file is also copied to the master disk. At 930, after user authentication, using the Robodisk software, the user selects to build an ABS image file to start the process. At 940, the user enters the name, such as the image part number, for the ABS image file. At 950, the user selects to build the image file for all of the copied content, and at 960, the building of the image file, a secure content file, is complete. As mentioned previously, support for any DRM system, other than a system that supports WMA files, can be provided in accordance with the present invention.

FIG. 10 illustrates an exemplary process whereby a secure content image is burned or copied onto a target medium for mass production. At 1000, the user selects the .ABS file image name (e.g., such as created in FIG. 9) and in the case of WMA files, the user ensures that the option for support of WMA files is selected. At 1010, the user specifies the location on the local machine or network location that contains the WMA protected content. At 1020, if the same machine that protected the content is not being utilized, then at 1030, the user reloads the DRM license store, and the location of the key file is specified for disk authentication. At 1040, the disk image is duplicated onto the target disk. At 1050, the content files on the disk have the appropriate DRM rights integrated with the serial number information from the target disk itself, thereby tying the media content to the target disk. At 1060, the duplication process is completed.

FIGS. 8 to 10 illustrate an exemplary three step process whereby first content is protected, then an encrypted disk image is built, and then the image is burned onto a target medium, tying the content to the target medium. Because the process is repeatable, and multiple target media may be produced according to this method, the need to thereafter apply for or purchase a license is unnecessary.

As utilized herein, the term integrating refers to a variety of means of incorporating information into a destination data file, and may refer to patching, concatenation, appending, hashing, replacing, or other integration techniques as well. Combinations and/or permutations of the same may be called for during an integration process, and the means for incorporation may be driven in part by the DRM system utilized in connection with the present invention.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with various embodiments described or shown in the various figures, it is to be understood that other similar embodiments may be used or modifications and additions may be made to the described embodiment(s) for performing the same function of the present invention without deviating therefrom. For example, although in a preferred embodiment the present invention has been described herein with respect to the context of music, the same concepts and techniques apply regardless of what the content represents. For example, the same techniques could be applied to motion pictures, photographs, etc. Therefore, the present invention should not be limited to any single embodiment, but rather construed in breadth and scope in accordance with the recitation of the appended claims.

What is claimed is:

1. A method for duplicating secure digital data, comprising:
   copying digital data and associated licensing data representing licensing rights from a master storage medium to a target storage medium; and
   integrating the serial number information of said target storage medium into the appropriate portion of said digital data and into said licensing data,
   whereby the content of said digital data and the license rights associated with said licensing data stored on said target storage medium are self-authenticating.

2. A method for duplicating secure digital data according to claim 1, wherein said licensing data is formatted according to the WMA format.

3. The method for duplicating secure digital data according to claim 1, further comprising:
   selecting at least one content file for duplication, wherein said at least one content file is said digital data;
   setting digital rights management (DRM) rights levels for each of said at least one content file; and
   generating said licensing data in accordance with said DRM rights levels.

4. A method for duplicating secure digital data according to claim 3, wherein said selecting at least one content file for duplication includes selecting at least one video file for duplication.

5. A method for duplicating secure digital data according to claim 3, wherein said selecting at least one content file for duplication includes selecting at least one audio file for duplication.

6. A method for duplicating secure digital data according to claim 3, wherein said selecting at least one content file for duplication includes selecting at least one software file for duplication.

7. A method for duplicating secure digital data according to claim 1, further comprising:
   encrypting said at least one content file with unique key information for each of said at least one content file, wherein said at least one content file is said digital data; and
   storing said unique key information in at least one content file and in the licensing data associated with said at least one content file.

8. A method for duplicating secure digital data according to claim 1, further comprising:
   storing said digital data and said licensing data in said master computer-readable medium.

9. A computer readable medium bearing computer executable instructions for carrying out the method of claim 1.

10. A modulated data signal carrying computer executable instructions for performing the method of claim 1.

11. A computer system in which a master storage medium may be copied to a plurality of target storage media, comprising:
   a computing device having read and write access to a master storage medium and a target storage medium, wherein said computing device copies digital data and associated licensing data representing licensing rights from the master storage medium to at least one of the plurality of target storage media, and wherein said computing device integrates the serial number information from said at least one of the plurality of target storage media into at least one file of said digital data and into said licensing data,
   whereby the content of said digital data and the license rights associated with said licensing data stored on said target storage medium are self-authenticating.

12. A computer system according to claim 11, wherein said licensing data is formatted according to the WMA format.

13. A computer system according to claim 11, wherein said computing device selects at least one content file for duplication, wherein said at least one content file is said digital data, wherein said computing device receives instructions for setting DRM rights levels for each of said at least one content file and wherein said computing device generates said licensing data in accordance with said DRM rights levels.

14. A computer system according to claim 13, wherein said computing device selects at least one video file for duplication.

15. A computer system according to claim 13, wherein said computing device selects at least one audio file for duplication.

16. A computer system according to claim 13, wherein said computing device selects at least one software file for duplication.

17. A computer system according to claim 11, wherein said computing device encrypts said at least one content file with unique key information for each of said at least one content file, wherein said at least one content file is said digital data, and said computing device stores said unique key information in at least one content file and in the licensing data associated with said at least one content file.

18. A computer system according to claim 11, wherein said computing device stores said digital data and said licensing data in said master computer-readable medium.

19. A method for duplicating secure digital music, comprising:
   selecting at least one content file for duplication;
   setting digital rights management (DRM) rights levels for each of said at least one content file;
   encrypting said at least one content file with unique key information for each of said at least one content file;
   storing said unique key information in the header for each of said at least one content file and in a license file associated with said at least one content file;
   storing said at least one content file and said license file in a master computer-readable medium;
   copying said at least one content file and said license file from a master computer-readable medium to a target computer-readable medium; and
   integrating the serial number information of said target computer-readable medium into said header of each of said at least one content file and into said license file,
   whereby the content of said at least one content file and the license rights associated with said license file stored on said target computer-readable medium are self-authenticating.

20. A method for duplicating secure digital music according to claim 19, further comprising:

copying said at least one content file and said license file from said master computer-readable medium to a second target computer-readable medium; and integrating the serial number information of said second target computer-readable medium into said header of each of said at least one content file and into said license file, whereby the content of said at least one content file and the license rights associated with said license file stored on said second target computer-readable medium are self-authenticating.

21. A method for duplicating secure digital music according to claim 19, wherein said selecting at least one content file for duplication includes selecting at least one audio file for duplication.

22. A method for duplicating secure digital music according to claim 19, wherein said selecting at least one content file for duplication includes selecting at least one video file for duplication.

23. A method for duplicating secure digital music according to claim 19, wherein the public key for authenticating the target storage medium is the serial number.

24. A method for duplicating secure digital music according to claim 19, wherein said unique key information is utilized as the private key of the asymmetric encryption algorithm utilized for encryption.

25. A method for duplicating secure digital music according to claim 19, wherein said license rights are formatted according to the WMA format.

26. A computer readable medium bearing computer executable instructions for carrying out the method of claim 19.

27. A modulated data signal carrying computer executable instructions for performing the method of claim 19.

* * * * *